UNITED STATES PATENT OFFICE

2,434,396
AMINODIPHENYL SULFIDES

Elmer W. Cook, New York, N. Y., and Philip H. Moss, Greenwich, Conn., assignors to American Cyanamid Company, New York, N. Y., a corporation of Maine No Drawing. Application August 28, 1943, Serial No. 500,427

6 Claims. (Cl. 260—571)

This invention relates to new organic compounds and to their preparation.

The compounds of the present invention have the general formula:

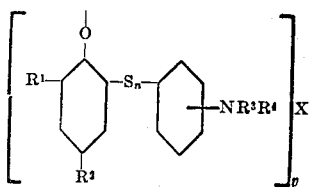

in which one or both of $R^1$ and $R^2$ are alkyl radicals having from about 1 to 20 carbon atoms, $R^3$ and $R^4$ are alkyl radicals having from one to about 5 carbon atoms each, $n$ is an integer 1 or 2, $X$ is hydrogen or a salt-forming metal, and $v$ is the valence of $X$.

The compounds having the above general formula are useful particularly as corrosion inhibitors. They are easily soluble in hydrocarbon oils and may be dissolved therein to give lubricating oils having anticorrosion characteristics. These compounds also act as mild detergents when dissolved in lubricating oils. Oils containing our new compounds are also useful as slushing oils because of their anticorrosion action. Our new compounds may also be used as inhibitors in pickling baths, as antioxidants for rubber, vegetable oils, gasoline, etc. In general, they are characterized by being brownish-yellow, heavy, viscous liquids.

Since it appears that the principal use of our new compounds will be in lubricating oils, it is necessary that they be oil soluble. The presence of extremely long chain alkyl groups tends to decrease the oil solubility of the compound and for this reason we prefer that the total number of carbon atoms in R' and R'', in the general formula above, does not exceed a total of about twenty. Alkyl groups having a total of from about 8 to 14 carbon atoms in R' and R'' are preferred for maximum solubility. Accordingly if either R' or R'' is hydrogen, the alkyl groups may be from 1 to 20 carbon atoms in length, preferably from 8 to 14. If both R' and R'' are alkyl groups then the total number of carbon atoms in the two is preferably within the range of about 8 to 14, not usually over about 20. As indicated by the formula above, the —OH group and —NR'''R'''' group may be in any unoccupied position on the benzene ring.

The above compounds may be prepared by reacting an alkyl phenol with a di-N-alkyl substituted aniline and sulfur chloride or sulfur dichloride. Suitable alkyl phenols include cresol, xylenol, 2,4-diamylphenol, p-tertiary-octylphenol, p-tertiary-butyl-o-cresol, 2,4-di-tertiary-octylphenol, p-dodecylphenol, p-octadecylphenol, 2,4-dioctylphenol, and others having 1 or 2 alkyl groups of from 1 to 20 carbon atoms. Suitable di-N-alkyl substituted anilines include; dimethylaniline, methylethylaniline, diethylaniline, dipropylaniline, methylbutylaniline, diamylaniline, and other N-substituted anilines having 2 alkyl groups of up to about 5 carbon atoms in length attached to the nitrogen atom on the benzene ring.

The alkyl phenol and the di-N-alkyl substituted aniline are joined by a sulfur group consisting of 1 or 2 sulfur atoms as shown in the general formula. To join the two benzene rings by a single sulfur atom, sulfur dichloride is used. When sulfur chloride is used, the benzene rings are linked with two sulfur atoms. The reaction whereby our new compounds are prepared is carried out with the alkyl phenol and the di-N-alkyl substituted aniline dissolved in a suitable solvent. Chlorinated solvents such as ethylene dichloride, trichloroethylene, carbon tetrachloride, chloroform, etc. are preferred since we have found that these solvents are particularly useful in keeping the reactants, intermediate products and reaction product in solution during the course of the reaction. As the reaction proceeds hydrogen chloride is formed which forms the hydrochloride salt of the di-N-alkyl substituted aniline and the final reaction product. Chlorinated solvents prevent the precipitation of such hydrochloride salts. It should be understood, however, that other solvents such as carbon disulfide may also be used if desired.

The reaction is brought about by merely adding the sulfur chloride or sulfur dichloride to a solution of an alkyl phenol and a di-N-alkyl substituted aniline at room temperature or, preferably, less than room temperature. The reaction is exothermic and it is generally advisable to surround the reaction vessel with a coolant, such as ice water. The reaction is generally complete within 15 or 20 minutes after the sulfur chloride or sulfur dichloride has been added. However, to insure complete reaction, the mixture is allowed to stand for a few hours and may even be heated up to 40 to 50° C. for a few minutes at the end of the reaction period. Part of the hydrogen chloride, which is formed during the reaction, is evolved and the evolution of this gas indicates the speed and course of the reaction. When hydrogen chloride is no longer given off, it may be assumed that the reaction is complete.

To recover the reaction product, the reaction mixture may be treated with a dilute solution of a mild alkali to neutralize the hydrochloric acid in the reaction mixture and to free the amine compound from its hydrochloride salt. After washing, the aqueous fraction is discarded and the solvent fraction evaporated to obtain the product. Usually the last stages of the solvent evaporation is carried out in vacuum to insure complete removal of solvent. When the compounds are to be used in lubricating oils, a part of the lubricating oil may be added to the solvent fraction and the excess solvent then evaporated away. This procedure makes the step of blending the compounds with lubricating oils an extremely simple one.

Although the compounds are useful in the form in which they have just been described they are better for some purposes, particularly as detergents, in the form of their metal salts. Some of the metal salts of these compounds are most conveniently prepared by merely adding a metal hydroxide such as barium hydroxide, calcium hydroxide, sodium hydroxide, potassium hydroxide, etc. to the reaction mixture after the compound has been formed, filtering and then heating to remove the water of reaction. Other metal salts may be prepared by treating the free amine compound with powdered aluminum, magnesium turnings, calcium metal, etc. or by heating with an alcoholate of a low boiling alcohol such as methanol. Other metal salts may be prepared by methods of double decomposition as by heating the sodium salt with a compound such as zinc chloride, aluminum sulfate, copper nitrate, etc.

Our invention will now be described in greater detail by means of the following examples in which the preparation of a number of representative compounds and metal salts thereof is specifically described. It should be understood, however, that these examples are given primarily for purposes of illustration and are not intended to be construed as limiting our invention to the particular compounds described in these examples or the particular conditions employed.

Example 1

A solution of 75 parts by weight of diethylaniline and 120 parts by weight of 2,4-diamylphenol in 240 parts by weight of ethylene dichloride was stirred in a flask cooled to 10° C. by an ice-water bath. To this liquid was added slowly 74 parts by weight of sulfur monochloride, the temperature in the flask being kept below 15° C. When all the sulfur monochloride was added, the product was let stand 12 hours at room temperature and then treated with sodium carbonate solution. The aqueous fraction was discarded and ethylene dichloride layer washed a second time with sodium carbonate solution. Addition of n-butyl alcohol assisted in giving a good separation into two layers. Evaporation of the solvent from the non-aqueous fraction gave 2-hydroxy-3,5-di-tertiaryamyl-4'-diethylaminophenyl disulfide.

The barium salt of 2-hydroxy-3,5-di-tertiaryamyl-4'-diethylaminophenyl disulfide was prepared by mixing 50 parts by weight of the product described in the preceding paragraph with 100 parts by weight of n-butyl alcohol and 35 parts by weight of barium hydroxide octahydrate. The mixture was heated to 130–140° C. while adding Solvesso No. 1 (toluol petroleum fraction) from time to time to compensate for the solvents boiled off. After all of the butyl alcohol and water had been removed from the reaction mixture, it was filtered and the Solvesso No. 1 removed by vacuum distillation to give the barium salt of 2-hydroxy-3,5-di-tertiaryamyl-4'-diethylaminodiphenyl disulfide as a clear yellowish-brown viscous liquid.

Example 2

Into 61 parts by weight of dimethylaniline and 120 parts by weight of 2,4-diamylphenol in 240 parts by weight of ethylenedichloride was dropped with stirring 74 parts by weight of sulfur monochloride, external cooling being employed to prevent the temperature from rising above 20° C. When the addition was complete, the product was stirred two hours at room temperature and then washed twice with sodium carbonate solution. A little n-butyl alcohol was used to prevent emulsion formation. When the ethylene dichloride solution was evaporated 2-hydroxy-3,5-di-tertiaryamyl-4'-dimethylaminodiphenyl disulfide was obtained as a yellowish-brown viscous liquid.

To 39 parts by weight of the product prepared as just described was added 96 parts by weight of n-butyl alcohol and 12 parts by weight of barium hydroxide. This mixture was stirred at 140° C. and Solvesso No. 1 was added to replace the butyl alcohol as it evaporated. When all the water and butyl alcohol had been removed the solution was filtered through Hyflo and vacuum-dried to remove Solvesso No. 1. The product obtained as barium salt of 2-hydroxy-3,5-di-tertiaryamyl-4'-dimethylaminodiphenyl disulfide.

Example 3

To 53 parts by weight of p-tertiaryoctylphenol and 31.2 parts by weight of dimethylaniline in 120 parts by weight of ethylene dichloride was added slowly, with stirring, 38 parts by weight of sulfur monochloride. The flask was immersed in an ice-water bath to prevent the reaction temperature from rising above 20° C. The addition required about one hour and at its conclusion the mixture was stirred two hours longer with no external cooling. After the ethylene dichloride solution was twice washed with sodium carbonate solution it was filtered and then evaporated to give 2-hydroxy-5-tertiaryoctyl-4'-dimethylaminodiphenyl disulfide.

Example 4

In 275 parts by weight of ethylene dichloride were mixed 159 parts by weight of 2,4-di-tertiaryoctylphenol and 75 parts by weight of diethylaniline. This solution was cooled in an ice-water bath and stirred during the dropwise addition of 70 parts by weight of sulfur monochloride, the reaction temperature being kept below 20° C. After the mixture had stood several hours it was treated with sodium carbonate solution, separated and washed again. The ethylene dichloride layer was evaporated under vacuum at 120° C. The residue was 2-hydroxy-3,5-di-tertiaryoctyl-4'-diethylaminodiphenyl disulfide.

Example 5

To 131 parts by weight of p-dodecylphenol and 75 parts by weight of diethylaniline in 250 parts by weight of ethylene dichloride was added slowly 70 parts by weight of sulfur monochloride. External cooling was necessary to keep the reaction temperature below 20° C. The mixture was then twice washed by a solution of sodium carbonate. Addition of n-butyl alcohol during the washing facilitated separtion into two layers. The ethylene dichloride solution was evaporated under vacuum at 120° C. to yield 2-hydroxy-5-dodecyl-4'-diethylaminodiphenyl disulfide.

Example 6

In 225 parts by weight of ethylene dichloride were mixed 120 parts by weight of 2,4-diamylphenol and 61 parts by weight of dimethylaniline. While this solution was stirred at 10–20° C., 53 parts by weight of sulfur dichloride was slowly dropped in. The mixture was stirred three hours more at 25–30° C. and was then washed well with aqueous sodium carbonate. The ethylene dichloride layer was filtered and evaporated under vacuum at 120° C. to give 2-hydroxy-3,5-di-tertiaryamyl-4'-dimethylaminodiphenyl sulfide.

Example 7

To 82 parts by weight of p-tertiarybutyl-o-cresol and 61 parts by weight of dimethylaniline, stirred in 240 parts by weight of ethylene dichloride below 20° C. was added slowly 74 parts by weight of sulfur monochloride. The reaction mixture remained at room temperature for 16 hours and was then washed twice with sodium carbonate solution. A small amount of n-butyl alcohol aided in breaking the emulsion formed during the washing. The ethylene dichloride solution was mixed with 170 parts by weight of S. A. E. #10 and vacuum-dried at 120° C. to remove the solvents. The material was filtered, removing small amounts of sodium carbonate and sodium chloride, giving a clear 50% solution of 2-hydroxy-3-methyl-5-tertiarybutyl-4'-dimethylaminodiphenyl disulfide in oil.

We claim:

1. A 2-hydroxy-3,5-ditertiaryamyl-4'-diethylaminodiphenyl sulfide.

2. The barium salt of 2-hydroxy-3,5-ditertiaryamyl-4'-diethylaminodiphenyl sulfide.

3. A 2-hydroxy-3,5-ditertiaryamyl-4'-dimethylaminodiphenyl sulfide.

4. Organic compounds of the formula

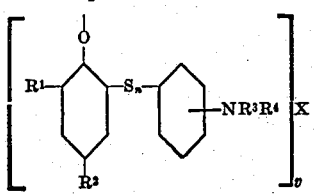

in which $R^1$ and $R^2$ are members of the group consisting of hydrogen and alkyl radicals at least one being an alkyl radical, $R^3$ and $R^4$ are alkyl radicals of from 1 to 5 carbon atoms, $n$ is an integer not greater than 2, X is a member of the group consisting of hydrogen and salt-forming metals, and $v$ is the valence of X.

5. Organic compounds of the formula

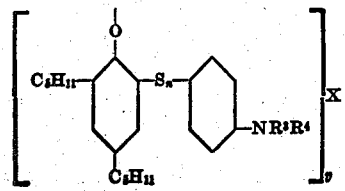

in which $R^3$ and $R^4$ are alkyl radicals of from 1 to 5 carbon atoms, $n$ is an integer not greater than 2, X is a member of the group consisting of hydrogen and salt-forming metals, and $v$ is the valence of X.

6. A method of preparing an organic compound of the formula

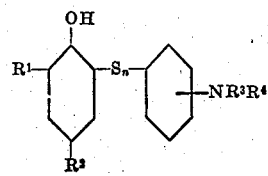

in which $R^1$ and $R^2$ are members of the group consisting of hydrogen and alkyl radicals at least one being an alkyl radical, $R^3$ and $R^4$ are alkyl radicals of from 1 to 5 carbon atoms inclusive, and $n$ is an integer not greater than 2 which comprises mixing in a solvent an alkyl phenol of the formula

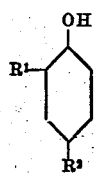

in which $R^1$ and $R^2$ are as defined above, a di-N-alkyl substituted aniline wherein each of the alkyl groups attached to the nitrogen is of from 1 to 5 carbon atoms, and a compound selected from the group consisting of sulfur chloride and sulfur dichloride and reacting the mixture at temperatures not in excess of about 50° C. until the evolution of hydrogen chloride has substantially ceased.

ELMER W. COOK.
PHILIP H. MOSS.

REFERENCES CITED

The following references are of record in the file of this patent:

UNITED STATES PATENTS

| Number | Name | Date |
| --- | --- | --- |
| 2,105,806 | Clifford | Jan. 18, 1938 |
| 2,269,265 | Hamilton | Jan. 6, 1942 |
| 2,290,860 | Burk et al. | July 28, 1942 |
| 2,315,072 | Nelson et al. | Mar. 30, 1943 |

OTHER REFERENCES

Chemical Abstracts, vol. 28, p. 6709 (1934).
Chemical Abstracts, vol. 33, p. 162 (1939).